(12) United States Patent
Kroepfl et al.

(10) Patent No.: US 8,675,122 B2
(45) Date of Patent: Mar. 18, 2014

(54) DETERMINING EXPOSURE TIME IN A DIGITAL CAMERA

(75) Inventors: Michael Kroepfl, Redmond, WA (US); Martin Josef Ponticelli, Graz (AT); Hannes Hegenbarth, Hausmannstaetten (AT); Gur Kimchi, Bellevue, WA (US); John Charles Curlander, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 12/354,797

(22) Filed: Jan. 16, 2009

(65) Prior Publication Data

US 2010/0182444 A1 Jul. 22, 2010

(51) Int. Cl.
 *G03B 7/00* (2006.01)
(52) U.S. Cl.
 USPC .......................................................... 348/362
(58) Field of Classification Search
 USPC .......................................... 348/362; 396/213
 See application file for complete search history.

(56) References Cited

U.S. PATENT DOCUMENTS

| | | | |
|---|---|---|---|
| 5,973,311 A * | 10/1999 | Sauer et al. ................. | 250/208.1 |
| 6,813,046 B1 | 11/2004 | Gindele et al. | |
| 6,895,256 B2 | 5/2005 | Harma et al. | |
| 7,173,663 B2 | 2/2007 | Skow et al. | |
| 2007/0102622 A1 | 5/2007 | Olsen et al. | |
| 2007/0257184 A1 | 11/2007 | Olsen et al. | |
| 2007/0263097 A1 * | 11/2007 | Zhao et al. ................. | 348/221.1 |
| 2008/0056704 A1 | 3/2008 | Ovsiannikov | |
| 2008/0079838 A1 * | 4/2008 | Kojima ........................ | 348/345 |
| 2008/0137908 A1 * | 6/2008 | Stein et al. ..................... | 382/103 |
| 2008/0158430 A1 * | 7/2008 | Hu ................................. | 348/672 |
| 2009/0073290 A1 * | 3/2009 | Umeyama ..................... | 348/248 |
| 2009/0086046 A1 * | 4/2009 | Reilly et al. ............... | 348/222.1 |
| 2010/0172542 A1 * | 7/2010 | Stein et al. ..................... | 382/103 |

FOREIGN PATENT DOCUMENTS

JP 2008181196 A * 8/2008

OTHER PUBLICATIONS

Machine translation of abstract and specification of Publication JP 2008181196 A.*
Nayar, et al., "Adaptive Dynamic Range Imaging: Optical Control of Pixel Exposures over Space and Time", Proceedings of the Ninth IEEE International Conference on Computer Vision (ICCV '03), retrieved at <<http://www.soe.ucsc.edu/classes/cmps290b/Fa1105/readings/Adaptive%20Dynamic%20Range%20Imaging%20-%20Nayar.pdf>>, 2003 IEEE, pp. 1-8.
"DN100 Digital Net Camera—Exposure Control and Camera Sensitivity", retrieved at <<http://www.microscopyu.com/articles/digitalimaging/dn100/exposure.html>>, Nov. 19, 2008, pp. 3.
"The Vexcel UltraCam Large Format Digital Aerial Camera", retrieved at <<http://www.aerial-survey-base.com/pdfs/Cameras_PDF/UCX/UltracamD_UCD_brochure.pdf>>, Jun. 8, 2008, pp. 4.

* cited by examiner

*Primary Examiner* — Clayton E LaBalle
*Assistant Examiner* — Dennis Hancock
(74) *Attorney, Agent, or Firm* — Steve Spellman; Jim Ross; Micky Minhas

(57) ABSTRACT

A digital camera described herein includes an analyzer component that analyzes a histogram of a first image, wherein the first image has a first resolution. The digital camera also includes a setter component that sets an exposure time for capturing a second image based at least in part upon the analysis of the histogram of the first image, wherein the second image has a second resolution, and wherein the first resolution of the first image is less than the second resolution of the second image.

20 Claims, 11 Drawing Sheets

DETERMINING EXPOSURE TIME IN A DIGITAL CAMERA

BACKGROUND

Digital cameras have become quite prevalent in today's society due to relatively low cost as well as ever-increasing quality of images obtained through use of digital cameras. For instance, many mobile telephones come equipped with digital camera technology, wherein such cameras can be of the order of three or more megapixels in resolution. An image printed with this resolution, for example, on a three inch by five inch piece of photo paper can be of substantially similar quality to an image printed through conventional film techniques.

When obtaining an image through use of a camera (digital or otherwise), an amount of exposure time for a particular image is often determined to improve image quality. Many conventional digital cameras include a separate exposure meter that observes a substantially similar field of view as seen through a lens of the digital camera. In some conventional digital cameras, this exposure meter can be activated by partially depressing a button on the camera. The exposure meter then determines an average intensity value that allows computation of an exposure time for an image that is to be taken through use of the digital camera. Such exposure meters, however, require additional electrical and optical components, thus rendering the digital camera more complex (and expensive). In addition, in such a camera it is not practical to obtain images at a relatively high frame rate such as between five and twenty-five frames per second.

In digital cameras that are configured to obtain images at a relatively high frame rate (e.g., five to twenty-five frames per second) exposure time for an image is typically determined through analysis of a previously captured full resolution image. More particularly, a conventional digital camera can record a series of full resolution images and can set an exposure time for a subsequent image based at least in part upon image content of a previously recorded full resolution image. In environments, however, where amount of light can change quickly, using a previously recorded full resolution image may cause an exposure time to be suboptimal for a subsequent image.

SUMMARY

The following is a brief summary of subject matter that is described in greater detail herein. This summary is not intended to be limiting as to the scope of the claims.

Various technologies pertaining to digital cameras in general and, more particularly, pertaining to determining an exposure time for an image using a digital camera are described in detail herein. A digital camera with a relatively high frame rate can be configured to obtain a first image. The first image can be captured, for instance by, a CCD image sensor, a CMOS image sensor or other suitable image sensor using a predefined exposure time. When reading out intensities captured in cells of the image sensor, such intensities can be combined in accordance with a binning factor. For instance, a binning factor of two would cause four intensities in four cells of the image sensor to be summed and/or averaged. In another example, a binning factor of four would cause a block of sixteen intensities corresponding to sixteen cells in the image sensor to be summed and/or averaged. Thus, the first image can be caused to have a first resolution that is less than a full resolution that can be obtained through use of the digital camera.

The resulting first image of the first resolution can be recorded, for instance, in memory of the digital camera and a histogram can be computed pertaining to the first image. The histogram can include various intensities observed in the first image of the first resolution and a number of occurrences of such intensities in the first image of the first resolution. The resulting histogram can be analyzed and a white point value can be determined through analysis of the histogram. The white point value can be a value for which a predefined percentage of observed intensities are at or below such white point value. For instance, the predefined percentage can be relatively high such as in the order of ninety-eight percent. An exposure time for a second image that is to be taken immediately subsequent to the first image can be determined based at least in part upon the white point value. Other attributes may also be taken into consideration when determining the exposure time for the second image including, but not limited to, the binning factor used when binning the first image, exposure time used when capturing the first image and/or a target gray value which is a value of the second image that may be on the order of twenty-five to fifty percent of a maximum gray value for a given radiometric resolution.

The digital camera may then be configured to capture the second image using the determined exposure time. The second image may be captured and recorded (e.g., without use of binning) such that the second image is of a second resolution that is higher than the first resolution of the first image. Upon recording the second image, the digital camera can be reconfigured to capture another image of the first resolution that can be used in connection with determining an exposure time for an immediately subsequently captured image.

Other aspects will be appreciated upon reading and understanding the attached figures and description.

DETAILED DESCRIPTION

Figure 1:
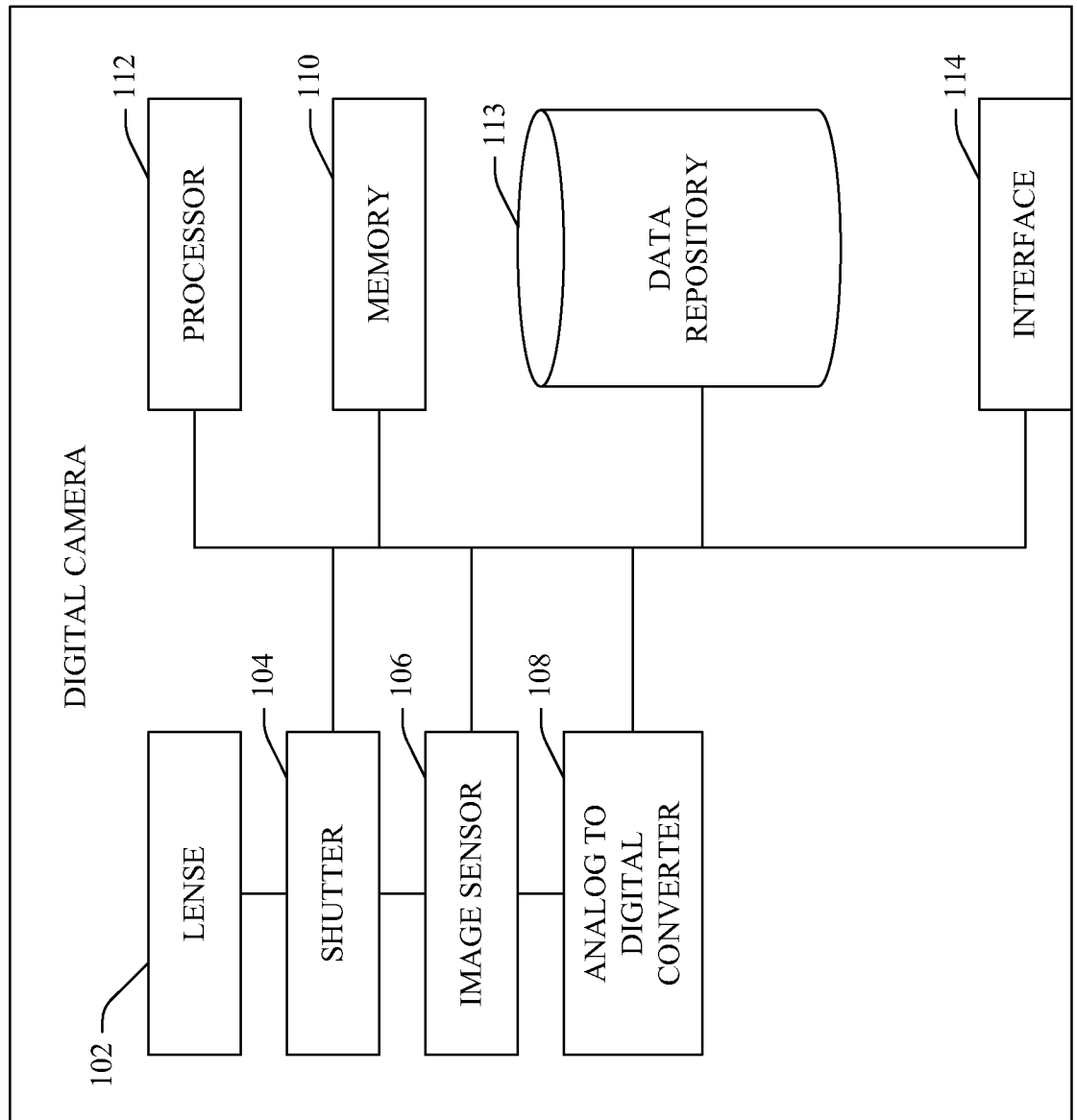
FIG. 1 is a functional block diagram of an example digital camera.

Various technologies pertaining to digital cameras in general, and more particularly pertaining to determining exposure time when capturing images will now be described with reference to the drawings, where like reference numerals represent like elements throughout. In addition, several functional block diagrams of example systems are illustrated and described herein for purposes of explanation; however, it is to be understood that the functionality that is described as being carried out by certain system components may be performed by multiple components. Similarly, for instance, a component may be configured to perform functionality that is described as being carried out by multiple components.

With reference to FIG. 1, an example digital camera 100 is illustrated. The digital camera 100 includes at least one lens 102 that is configured to focus light that can be received by the digital camera 100 by way of the lens 102. A shutter 104 can be selectively opened and closed to control an amount of time (exposure time) that light is captured by way of the lens 102. In another example, the shutter 104 may be an electronic shutter, where captured charges are shifted to an area of an image sensor where light is blocked. For instance, a shorter exposure time may be desirable in brighter environments while a longer exposure time may be desirable in darker environments.

An image sensor 106 that includes a plurality of cells or photosites can be used to capture intensity of light received by way of the lens 102 when the shutter 104 is open. For example, the image sensor 106 can be a CCD image sensor and/or a CMOS image sensor. A number of cells (photosites) in the image sensor 106 can correspond to a number of pixels, and thus resolution that can be included in an image generated by the digital camera 100. The digital camera 100 may optionally include an analog to digital converter 108. For instance, if the image sensor 106 is a CCD image sensor, the analog to digital converter 108 can transform values for each pixel into a digital value by measuring an amount of charge at each cell in the image sensor 106 and converting that measurement to binary form. If the image sensor 106 is a CMOS image sensor, the analog to digital converter 108 may not be needed. Furthermore, while not shown, the digital camera 100 may include one or more color filters that are used in connection with determining a color that corresponds to intensity of charges in cells in the image sensor 106.

The digital camera 100 may additionally include a memory 110 that can store instructions for execution by a processor 112. Intensity values captured by the image sensor 106 can be read out and stored in the memory 110. The memory 110 can include instructions and/or values for setting an exposure time for capturing an image. Thus, the shutter 104 can be controlled based at least in part upon an exposure time in the memory 110. The processor 112 can also be configured to filter intensity values in image sensor 106 and assign color values to one or more pixels.

The digital camera 100 can also include a data repository 113 that can be utilized in connection with storing images captured by the digital camera 100. The data repository 113 can be configured to store compressed and/or uncompressed images as well as images in a variety of formats. Furthermore, the data repository 113 can be integrated into the digital camera 100 and/or be removable, such as a removable flash drive.

The digital camera 100 can also include an interface 114 that can be used in connection with transferring data between the digital camera 100 and an external computing device. For instance, the interface 114 may be or include a wireless antenna that allows the digital camera 100 to communicate wirelessly with an external computing device. In another example, the interface 114 may be a universal serial bus interface, a firewire interface or other suitable interface. As will be described in greater detail herein, components that can be stored in memory 110 and executed by the processor 112 can be used in connection with setting an exposure time when capturing images. Thus, for instance, the shutter 104 can be controlled in accordance with the determined exposure time when capturing images. Pursuant to an example, a first exposure time can be set for the shutter 104 in connection with capturing a first image when the first exposure time may be in the order of ten microseconds. The image sensor 106 can capture a first image when the shutter 104 is operated using the first exposure time. Cells (photosites for pixels) can be binned, where binning refers to summing or averaging intensity values captured in a plurality of cells. Thus, binning can effectively reduce resolution of a captured image and therefore the first image can be of a first resolution which is less than a full resolution image that the digital camera 100 is capable of producing. As alluded to above, binning can be undertaken by summing or averaging intensity values in cells of the image sensor 106 as such intensity values are read out of the image sensor 106.

The resultant first image of the first resolution can be recorded (e.g., stored in memory 110). The first image of the first resolution can be analyzed and an exposure time for capturing a second full resolution image can be ascertained based at least in part upon the analysis. This exposure time can then be used to control the shutter 104 when a digital camera 100 is operated to capture an image. As noted above, the digital camera 100 can have a relatively high frame rate and the full resolution image can be captured immediately subsequently to the first image being captured by the digital camera 100. For instance, the second image can be captured within twenty milliseconds of the first image being captured.

Figure 2:
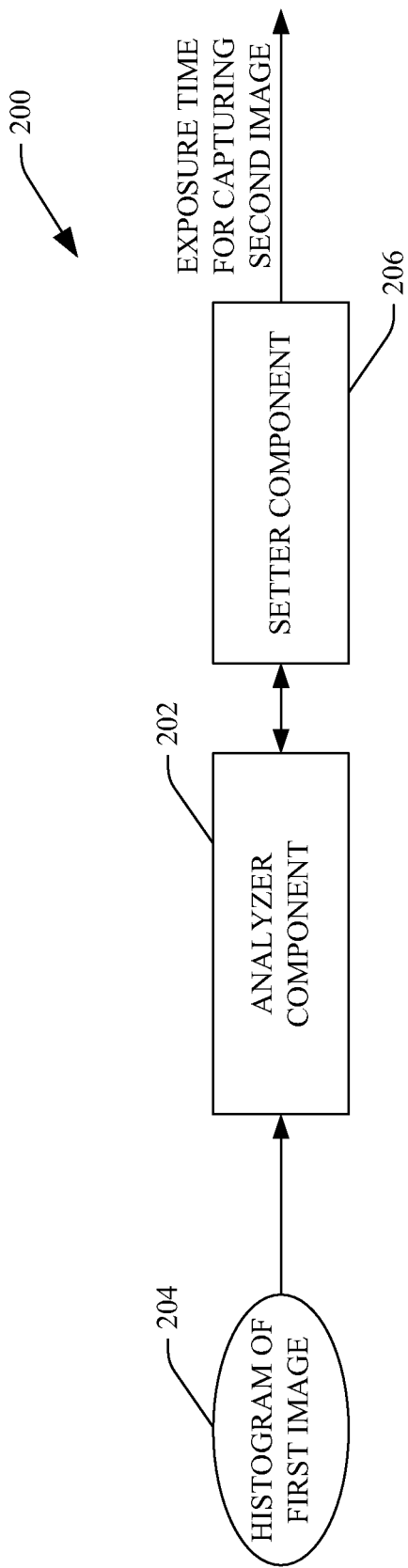
FIG. 2 is a functional block diagram of an example system that facilitates determining and setting an exposure time for capturing a digital image.

Referring now to FIG. 2, an example system 200 that facilitates determining an exposure time to employ when capturing a full resolution image is illustrated. The system 200 includes an analyzer component 202 that receives a histogram of a first image 204. As noted above, the first image can be of a resolution that is less than a full resolution (e.g., a resolution that a digital camera that includes a system 200 is capable of producing). The histogram of the first image 204 can include a number of occurrences of a plurality of intensity values corresponding to the pixels of the first image. The intensity values can be intensity values corresponding to a bin of pixels.

The analyzer component 202 can analyze the histogram of the first image 204 and can compute a white point value pertaining to the histogram of the first image 204. The white point value corresponds to an intensity value wherein a predefined percentage of intensity values in the histogram of the first image 204 are at or below the intensity value that is the white point value. For instance, the white point value can be an intensity value wherein ninety-eight percent of intensity values in the histogram of the first image 204 are at least or below the intensity value that is the white point value.

The system 200 further includes a setter component 206 that sets an exposure time for capturing a second image based at least in part upon the analysis of the histogram of the first image 204. For instance, the setter component 206 can set the exposure time for capturing a second image based at least in part upon the white point value. Thus the setter component 206 can cause the shutter 104 (FIG. 1) to operate in accordance with the determined exposure time for capturing the second image. Furthermore, the first resolution of the first image can be less than a second resolution of the second image. For instance, the resolution of the second image can be a full resolution image.

In addition to the white point value, the setter component 206 can take into consideration various other factors when determining an exposure time to use when capturing the second image. For instance, the setter component 206 can be configured to determine the exposure time used for capturing the second image based at least in part upon a binning factor used in connection with binning pixels of the first image. In another example, the setter component 206 can be configured to determine the exposure time for capturing the second image based at least in part upon an exposure time used to capture the first image. Still further, the setter component 206 can determine the exposure time for capturing a second image based at least in part upon a target gray value, wherein the target gray value is a target gray value for the second image that may be in order of twenty-five to fifty percent of a maximum gray value for a given radiometric resolution (e.g., 2048 for a 12-bit image where a maximum gray value possible is 4095). In a detailed example, the setter component 206 can use the following equation when determining the exposure time for capturing the second image.

$$ET_{image2} = BF^2 * \frac{TGV}{WP} * ET_{image1},$$

where $ET_{image2}$ is the exposure time to use when capturing the second (full resolution) image, BF is the binning factor used when binning intensity values of the first image, TGV is the target gray value, WP is the white point value, and $ET_{image1}$ is the exposure time used to capture the first image (with less than full resolution).

As indicated above, the setter component 206 can set the exposure time for capturing the second image using the determined exposure time. Setting the exposure time can be or include causing such exposure time to be stored in the memory 110 (FIG. 1). In another example, setting the exposure time can include configuring the processor 112 to transmit commands to the shutter 104 to cause the shutter 104 to operate in accordance with the exposure time for capturing the second image determined by the setter component 206.

Figure 3:
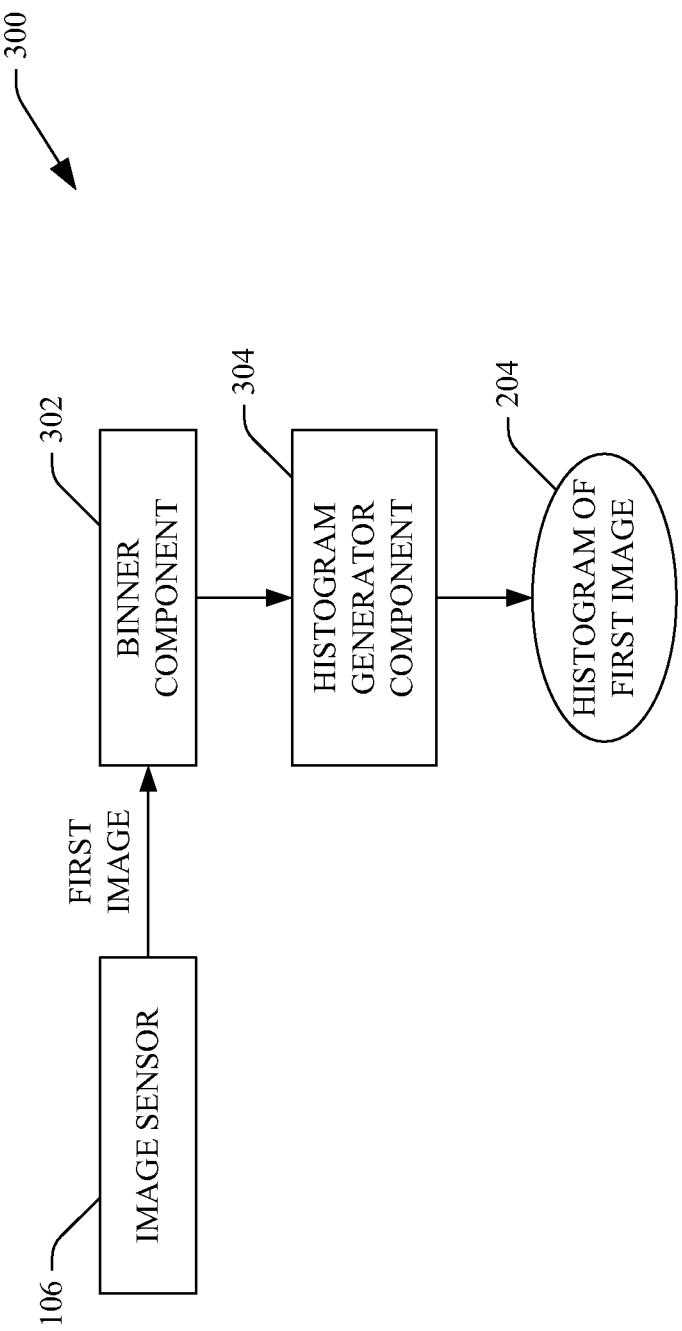
FIG. 3 is a functional block diagram of an example system that facilitates computing a histogram of a captured image.

Referring now to FIG. 3, an example system 300 that facilitates generating the histogram of the first image 204 is illustrated. The system 300 includes the image sensor 106 that comprises a plurality of cells or photosites. In this example, the image sensor 106 has been employed to capture the first image such that the cells of the image sensor 106 include various intensity values corresponding to a field of view of the digital camera.

The system 300 additionally includes a binner component 302 that reads intensity values from the image sensor 106 and uses binning to cause the first image to be of a first resolution (e.g., a resolution less than a full resolution). More specifically, the binner component 302 can read out intensity values of blocks of cells in the image sensor 106 and can sum such intensity values to create a binned value. In another example, the binner component 302 can read out intensity values corresponding to a block of cells and can average such intensity values to create a binned value. Thus, binning can refer to adding together electrical charges collected in a number of cells of the image sensor 106. Therefore, for instance, if the binner component 302 uses a binning factor of four to bin intensity values in cells of the image sensor 106, charges for intensity values of sixteen cells are read out at once and placed into one output binned value. For example, the binning factor used by the binner component 302 can be set in advance by a user and can be greater than zero but less than one-fourth of the number of cells in the image sensor 106. Further, for instance, the binner component 302 can cause the first image of the first resolution to be recorded in the memory 110.

The system 300 can further include a histogram generator component 304 that can generate the histogram of the first image 204. As noted above, the histogram of the first image 204 can include a plurality of different intensity values and a number of occurrences of such intensity values in the first image. As noted above the histogram of the first image 204 can be analyzed by the analyzer component 202 (FIG. 2), wherein an analysis of the histogram of the first image 204 can include determining a white point value pertaining to the first image.

Figure 4:
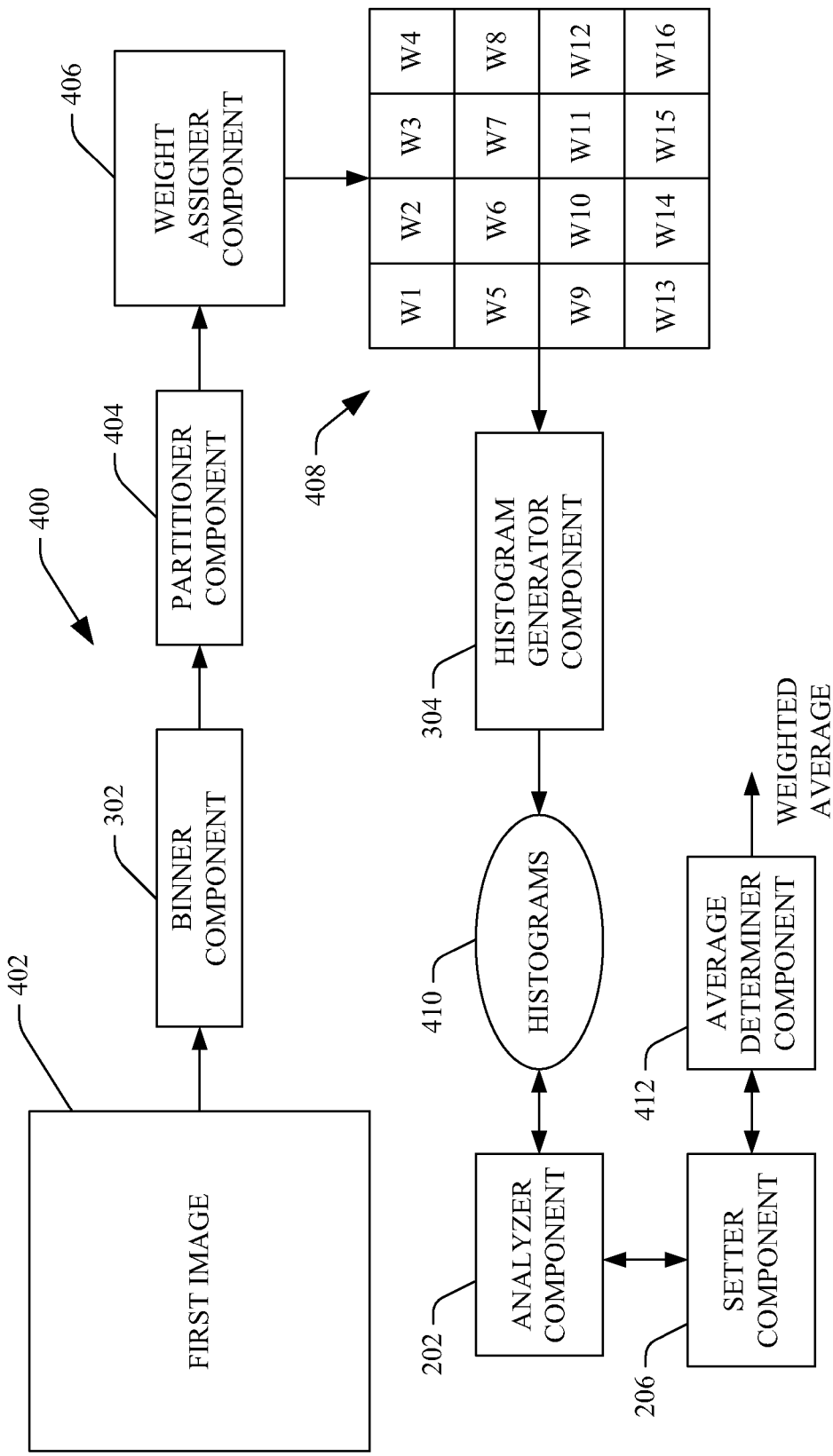
FIG. 4 is a functional block diagram of an example system that facilitates determining an exposure time for capturing an image based at least in part upon partitions of a previously captured image.

Turning now to FIG. 4, an example system 400 that facilitates determining an exposure time to use when capturing an image is illustrated. The system 400 includes the binner component 302 that receives a first image 402. As described above, the first image 402 may be embodied in cells or photosites of the image sensor 106 (FIG. 1). The binner component 302 can cause the first image 402 to be of a resolution less than a full resolution by binning intensity values of blocks of cells of the image sensor, as described above.

The system 400 also includes a partitioner component 404 that can partition the first image 402 into a plurality of partitions. The partitioner component 404 can undertake such partitioning subsequent to binner component 302 performing binning. A shape and number of partitions can depend upon application of a digital camera and/or an environment where the digital camera is used. The system 400 can further include a weight assigner component 406 that is in communication with the partitioner component 404, wherein the weight assigner component 406 can assign weights to each of the plurality of partitions. For instance, it may be desirable to avoid providing equal weight to a top portion of an image and a bottom portion of an image when determining exposure time. For example, it may be desirable to have a higher quality image near a center of an image when compared to an exterior of an image. In the example shown in FIG. 4, the partitioner component 404 can partition the first image (after binning) into sixteen partitions. The weight assigner component 406 can assign weights to each of the sixteen partitions 408, wherein weights assigned by the weight assigner component 406 are indicative of importance of the respective partitions of the first image.

The histogram generator component 304 can generate a plurality of histograms 410 that correspond to the plurality of partitions 408. Thus, in this example, the histogram generator component 304 can generate sixteen histograms that correspond to the sixteen partitions 408.

The analyzer component 202 may then analyze each of the histograms 410. For instance, the analyzer component 202 can determine white point values for each of the histograms 410. The setter component 206 may then determine exposure times for each of the partitions 408 based at least in part upon the analysis undertaken by the analyzer component 202. Thus, continuing with this example, the setter component 206 can determine sixteen exposure times with respect to the sixteen partitions 408.

An average determiner component 412 can determine a weighted average for the exposure times determined by the setter component 206, wherein the weighted average is based at least in part upon the weights assigned to the partitions by the weight assigner component 406. For instance, the average determiner component 412 can use the following equation in connection with determining a weighted average and thus determining an exposure time to use for a second full resolution image:

$$ET_{image2} = \frac{\sum_{i=1}^{n} w_i * ETpartition_i}{\sum_{i=1}^{n} w_i},$$

where n is a number of partitions in the image, w is a weight assigned to a partition, and ETpartition is an exposure time determined for a particular partition.

Figure 5:
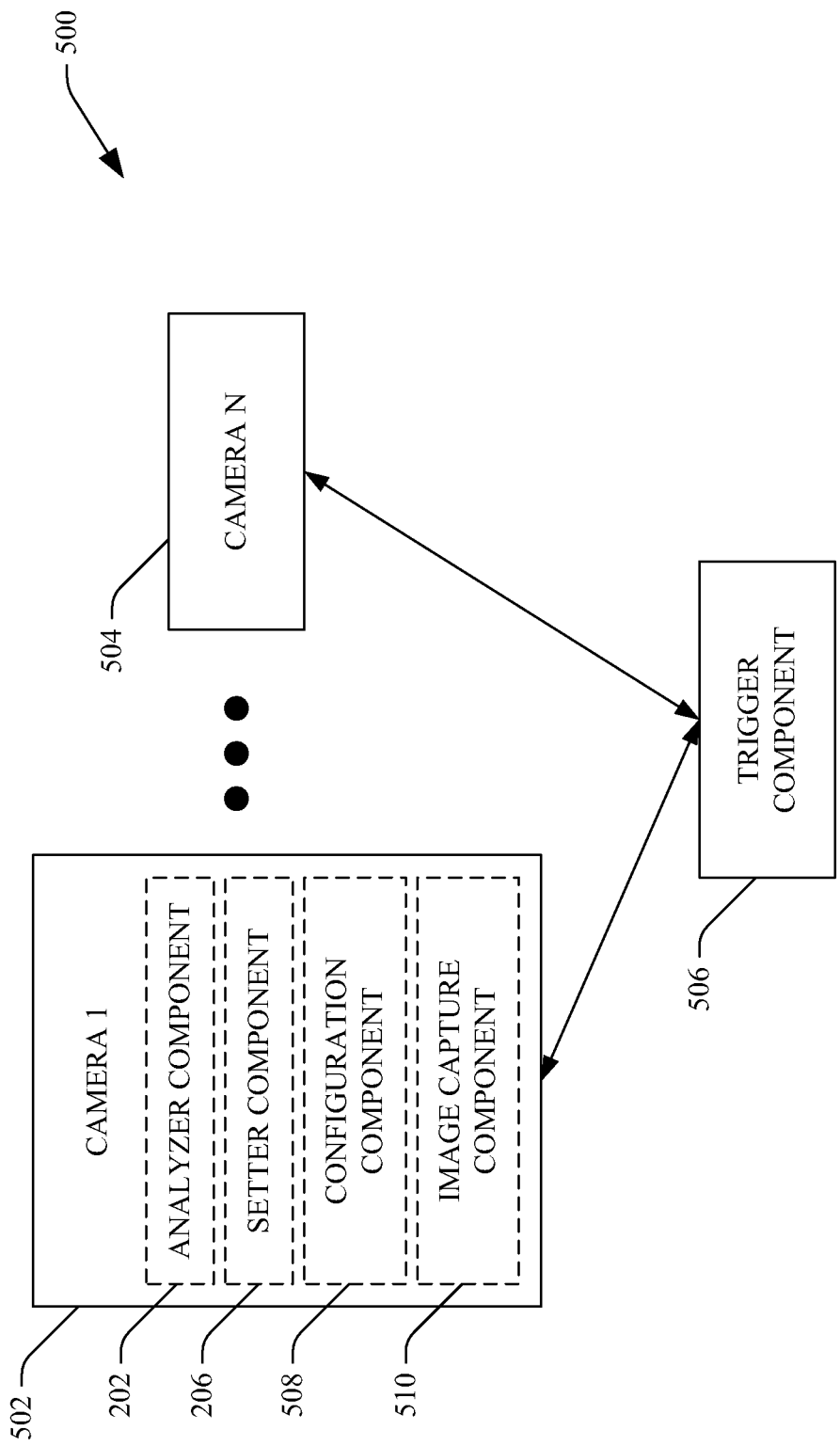
FIG. 5 is a functional block diagram of an example system that facilitates substantially simultaneously causing a plurality of cameras to capture images.

Turning now to FIG. 5, an example system 500 that facilitates causing a plurality of digital cameras to capture images at a substantially similar time is illustrated. The system 500 includes a first digital camera 502 through an nth digital camera 504, where n is an imager greater than two. A trigger component 506 is in communication with both the first camera 502 and the nth camera 504. The trigger component 506 can transmit trigger signals to the first camera 502 and the nth camera 504 substantially synchronously such that the first camera 502 and the nth camera 504 can capture images at substantially similar instances in time.

The first camera 502 includes the analyzer component 202 and the setter component 206, which act in conjunction as described above. The first camera 502 can also include an image capture component 508 that can configure the first camera 502 to capture a first image, wherein the first image has a first resolution that is less than a full resolution (e.g., a highest capable resolution for the camera). For instance, the image capture component 508 can configure the camera 502 with a first exposure time (e.g., in the order of ten microseconds) and can further configure the camera 502 to perform binning upon receipt of an image. Upon the image capture component 508 configuring the first camera 502 for capturing the first image, the image capture component 508 can transmit a signal to the trigger component 506 indicating that the first camera 502 is configured to capture the first image. Similarly, while not shown, the nth camera 504 can include an image capture component that transmits a signal to the trigger component 506 indicating that the nth camera is configured to capture an image of a resolution that is less than a full resolution. Upon the trigger component 506 receiving signals from the first camera 502 and the nth camera 504 indicating that the cameras 502-504 are configured to capture an image of a first resolution (less than full resolution), the trigger component can transmit a trigger signal to each of the first camera through the nth camera 502-504.

The first camera 502 can additionally include an image capture component 510. The image capture component 510 can cause the first camera 502 to capture an image responsive to receipt of a trigger from the trigger component 506. For instance, the first camera 502 can capture the image while being configured in accordance with configurations output by the configuration component 508. Thus, a shutter in the first camera 502 can operate in accordance with a configuration output by the configuration component 508.

After the first image has been captured by the first camera 502, binning of such first image can be undertaken as described above. Thereafter a histogram can be computed and the analyzer component 202 (FIG. 2) and the setter component 206 can act in conjunction to determine an exposure time to use when capturing a subsequent, higher resolution image (e.g. full resolution image). Once the exposure time for capturing the second image has been determined, the configuration component 508 can configure the first camera 502 to operate in accordance with the determined exposure time. Furthermore, the configuration component 508 can turn off binning.

After the first camera 502 is configured to capture the second image, the first camera 502 can output a signal to the trigger component 506 indicating that the first camera 502 is configured to capture the second image. The nth camera 504 can operate in a similar manner. When the trigger component 506 receives an indication that the cameras 502-504 are configured to capture a second image (at a higher resolution when compared to the resolution of the first image), the trigger component 506 can synchronously transmit a second trigger signal to the first camera 502 through the nth camera 504. For instance, the image capture component 510 can receive the second trigger signal from the trigger component 506 and can cause the camera 502 to capture a second image.

After the second image has been captured and recorded, the configuration component 508 can again configure the first camera 502 to capture an image of the first resolution (e.g., a lower resolution than a full resolution). As noted above, the configuration component 508 can set an exposure time for capturing an image of less than full resolution and can turn binning on. Such process can repeat until no further images are desired. Pursuant to an example, the cameras 502-504 can be configured to capture between five and twenty-five images of full resolution per second and thus can be configured to capture between five and twenty-five images of less than full resolution per second.

While the trigger component 506 is shown as being separate from the cameras 502-504, it is to be understood that the trigger component 506 may be internal to a camera. Thus, a camera in a camera system may act as a master camera. In another example the trigger component 506 can be configured to output trigger signals to a single camera.

In an example application of the system 500, the cameras 502-504 and the trigger component 506 can be mounted onto a moving automobile. The cameras can be configured to capture images of buildings, trees, etc. as the automobile is travelling over a street. Resulting images may then be used in connection with generating a three-dimensional model of a street, a building, a city, etc.

Figure 6:
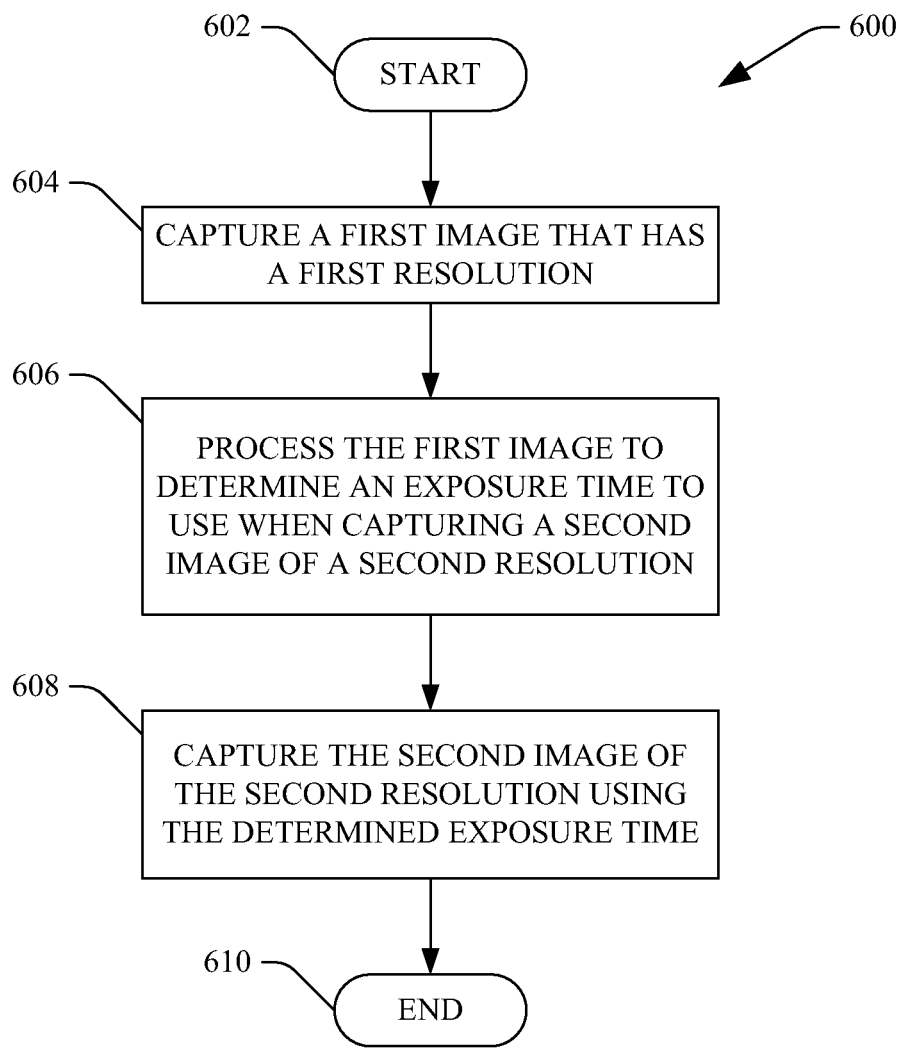
FIG. 6 is a flow diagram that illustrates an example methodology for setting an exposure time for capturing an image in a digital camera.
Figure 7:
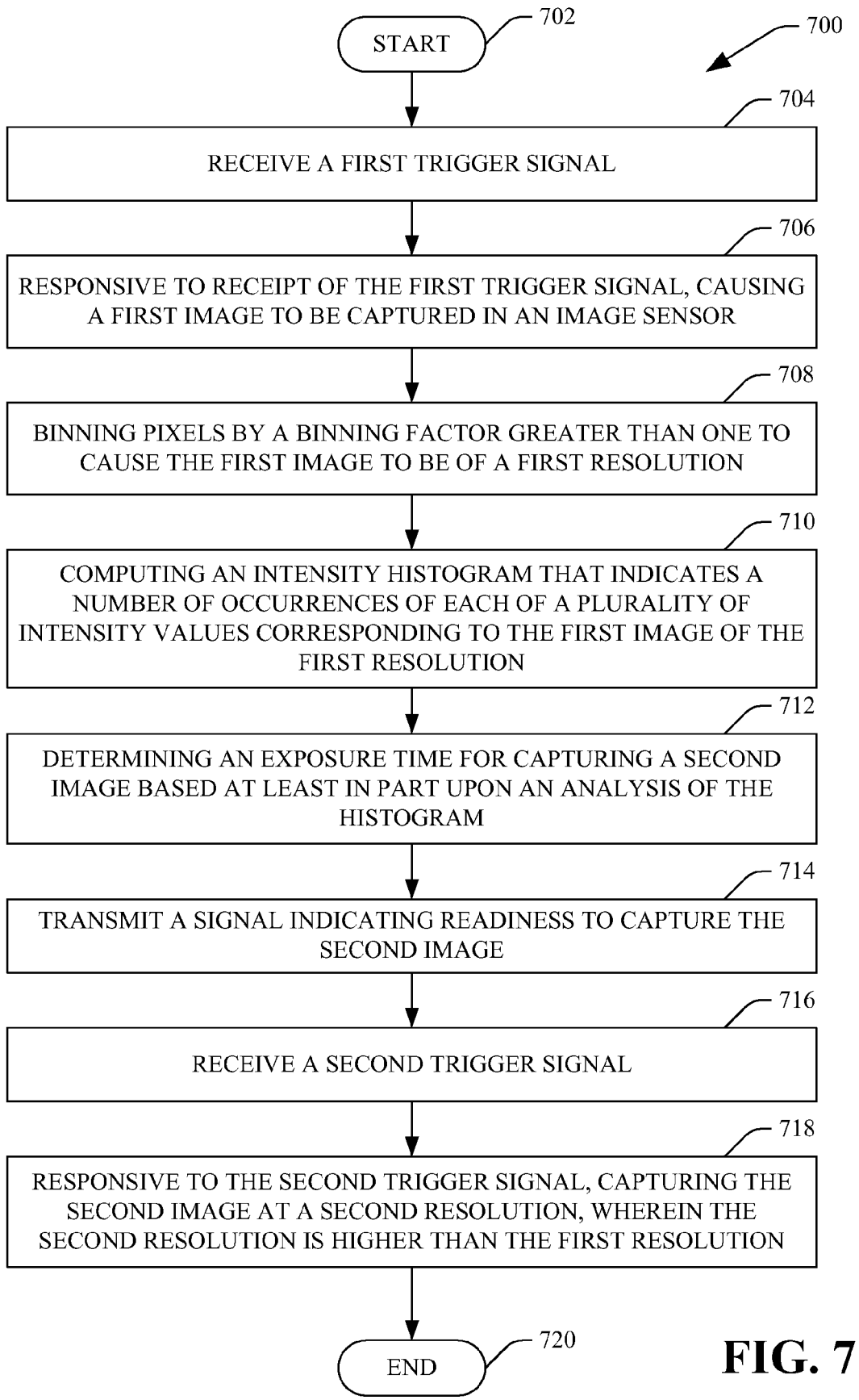
FIG. 7 is a flow diagram that illustrates an example methodology for capturing an image using a determined exposure time.
Figure 8:
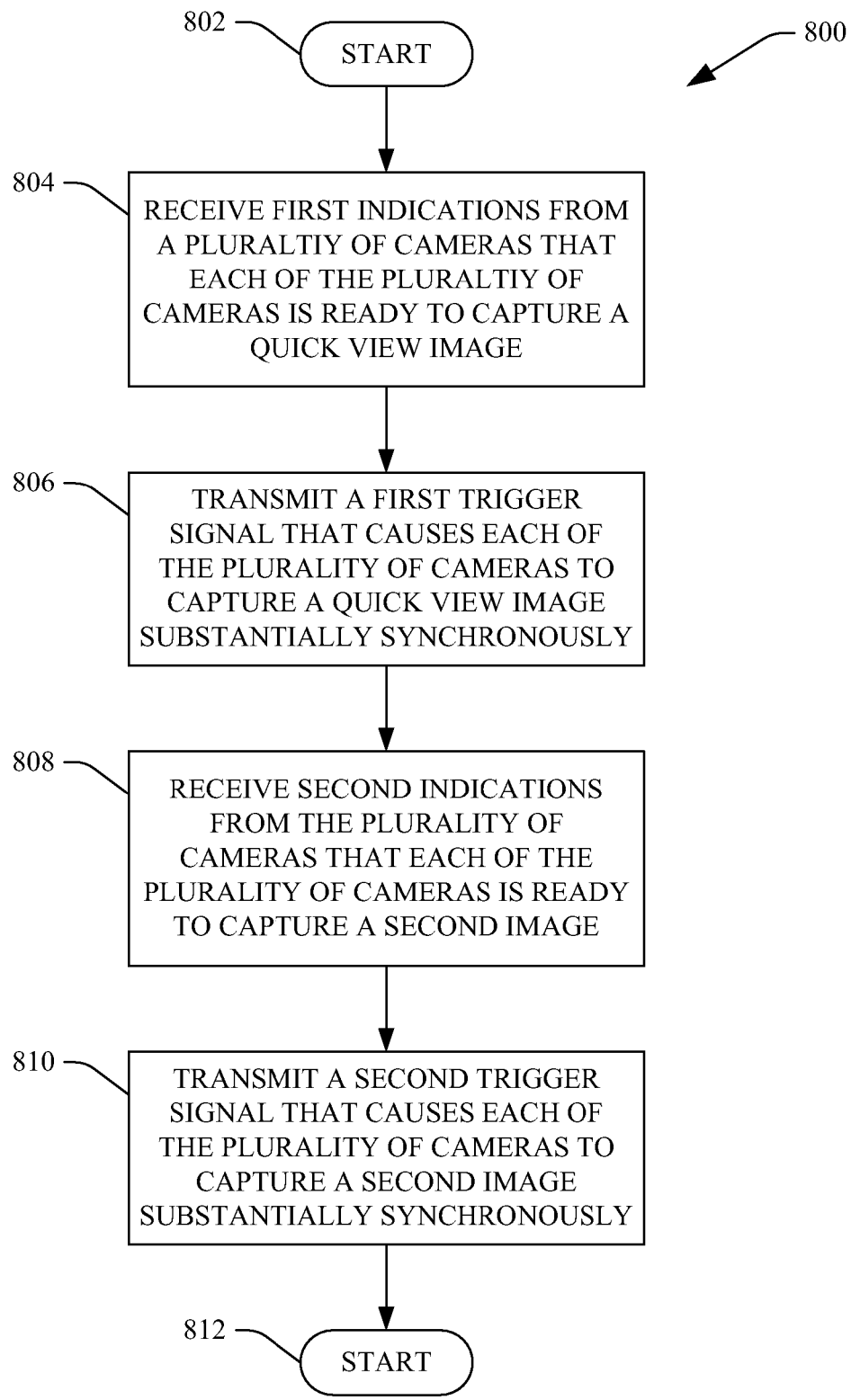
FIG. 8 is a functional block diagram of an example system that causes a plurality of digital cameras to substantially simultaneously capture images.

With reference now to FIGS. 6-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates determining an exposure time for capturing a full resolution image and capturing such full resolution image is illustrated. The methodology 600 begins at 602, and at 604 a first image is captured that has a first resolution. For instance, the first resolution may be less than a full resolution. Furthermore, the first resolution may be obtained by performing binning with respect to cells in an image sensor.

At 606, the first image is processed to determine an exposure time to use when capturing a second image of a second resolution, wherein the second resolution is higher than the first resolution. For instance, the second resolution may be a full resolution. As noted above, processing the first image can include computing a histogram of intensity values pertaining to bins of the first image and further determining a white point value using such histogram. The processing may further include executing an algorithm that takes into consideration the determined white point value along with, for instance, a binning factor, a target gray value and an exposure time used to capture the first image.

At 608 the second image of the second resolution is captured using the determined exposure time. The methodology completes at 610.

Now referring to FIG. 7, an example methodology 700 for capturing a second image at a second resolution based at least in part upon an exposure time used when capturing the first image of a first resolution is illustrated, wherein the first resolution is less than the second resolution. The methodology 700 starts at 702, and at 704 a first trigger signal is received. For instance, the first trigger signal may be received from an external device that also provides the first trigger signal synchronously with a plurality of other digital cameras.

At 706, a first image is caused to be captured in an image sensor of a digital camera responsive to receipt of the first trigger signal. As noted above, the image sensor can be a CMOS image sensor or a CCD image sensor.

At 708, pixels can be binned by a binning factor greater than one to cause the first image to be of a first resolution. As noted previously, binning pixels can relate to summing or averaging intensity values captured in a block of cells of the image sensor, wherein size of a side of the block can be indicative of the binning factor. Thus using a binning factor of four would cause sixteen intensity values pertaining to sixteen cells to be summed or averaged.

At 710, an intensity histogram that indicates a number of occurrences of each of a plurality of intensity values corresponding to the first image of the first resolution is computed. More particularly, each bin can have a corresponding intensity value that is obtained by summing intensity values of cells in the bin. The computed histogram can indicate a number of occurrences of each intensity value of the bins in the first image.

At 712, an exposure time for capturing a second image is determined based at least in part upon an analysis of the histogram. As described above, an analysis of the histogram can include computing a white point value.

At 714, a signal can be transmitted indicating readiness to capture the second image. For example, such signal can be transmitted from the digital camera to an external triggering component, wherein the triggering component is configured to provide trigger signals substantially synchronously to a plurality of digital cameras. Furthermore, prior to transmitting the signal, binning in the digital camera can be turned off.

At 716, a second trigger signal is received. Again, this second trigger signal can be received after the digital camera transmits a signal indicating that it is ready to capture the second image. Furthermore, the second trigger signal can be received from the triggering component that is configured to substantially synchronously provide trigger signals to a plurality of digital cameras.

At 718 a second image is captured at a second resolution, wherein the second resolution is higher than the first resolution (of the first image). The second image can be captured responsive to receipt of the second trigger signal. For instance, the second resolution can be a full resolution (e.g., a highest resolution capable of being captured by the digital camera). The second image may then be stored on a computer readable media. The methodology 700 completes at 720.

Referring now to FIG. 8, an example methodology 800 for transmitting trigger signals to a plurality of digital cameras substantially synchronously is illustrated. The methodology starts at 802, and at 804 a first indication is received from a plurality of cameras that each of the plurality of cameras is ready to capture a quick view image. As used herein, a quick view image can refer to an image of less than full resolution which can be obtained, for example, by binning cells in an image sensor within a digital camera.

At 806, a first trigger signal that causes each of the plurality of digital cameras to capture a quick view image is transmitted substantially synchronously to each of the plurality of cameras. For example, each of the plurality of cameras can be in communication with a central triggering component.

At 808, a second indication is received from the plurality of cameras that each of the plurality of cameras is ready to capture a second image, wherein the second image can be of a second resolution that is higher than the first resolution of the quick view image. In an example the second resolution can be a full resolution. Such an indication may be a logical high, a logical low or some combination thereof.

At 810, a second trigger signal is transmitted to each of the plurality of cameras that causes each of the plurality of cameras to substantially synchronously capture a second image. As noted above, such a second image can be of full resolution. Furthermore, the second image can be captured immediately subsequently to the first image being captured. The methodology 800 completes at 812.

Figure 9:
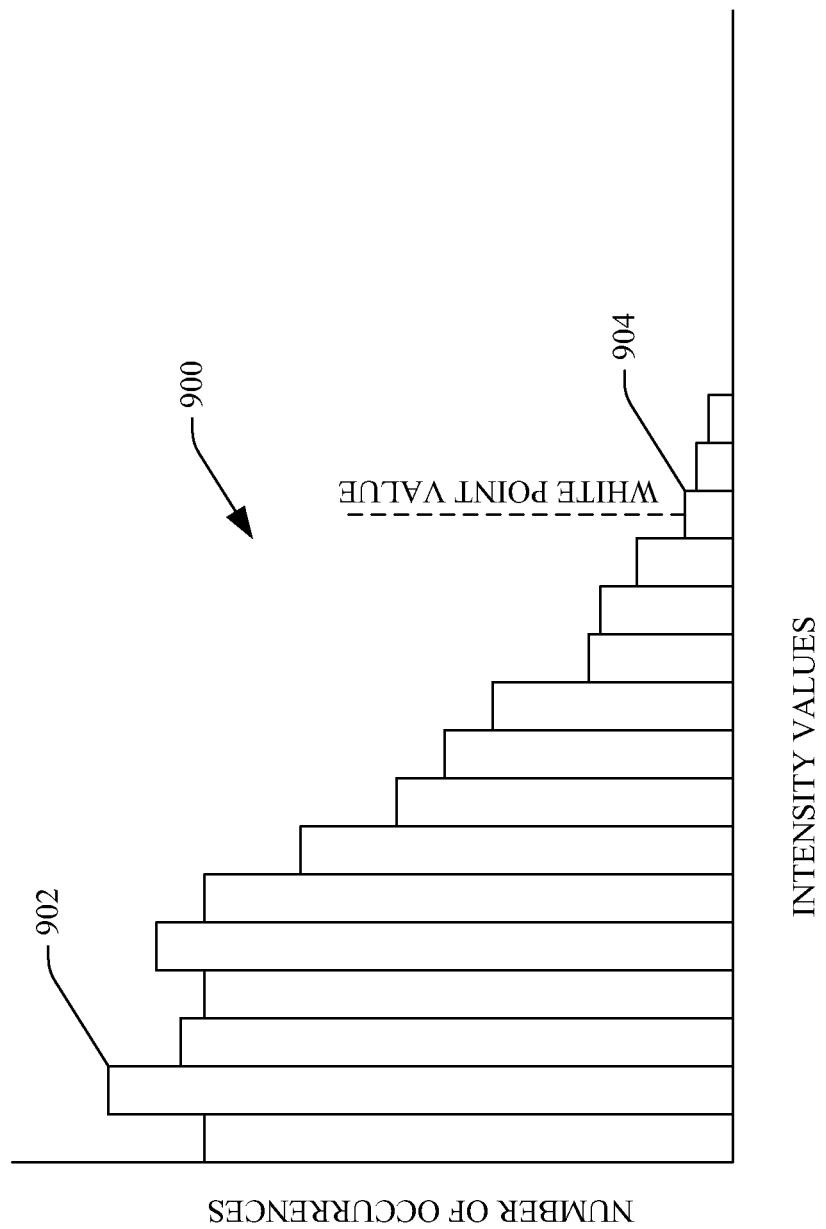
FIG. 9 is an example histogram.

With reference now to FIG. 9, an example histogram 900 is graphically illustrated. The histogram 900 indicates a number of occurrences for each of a plurality of intensity values that can be found with respect to bins in an image. Thus, it can be discerned that an intensity value corresponding to the bar 902 has occurred more times in the image than any other intensity value. As described above, a white point value can be computed by analyzing the histogram, wherein the white point value is an intensity value where a certain percentage of pixels have the white point intensity value or lower. In the example, the certain percentage can be ninety-eight percent or ninety-nine percent. In this example, the white point value corresponds to the intensity value of bar 904. The aforementioned percentage value can be empirically optimized.

Figure 10:
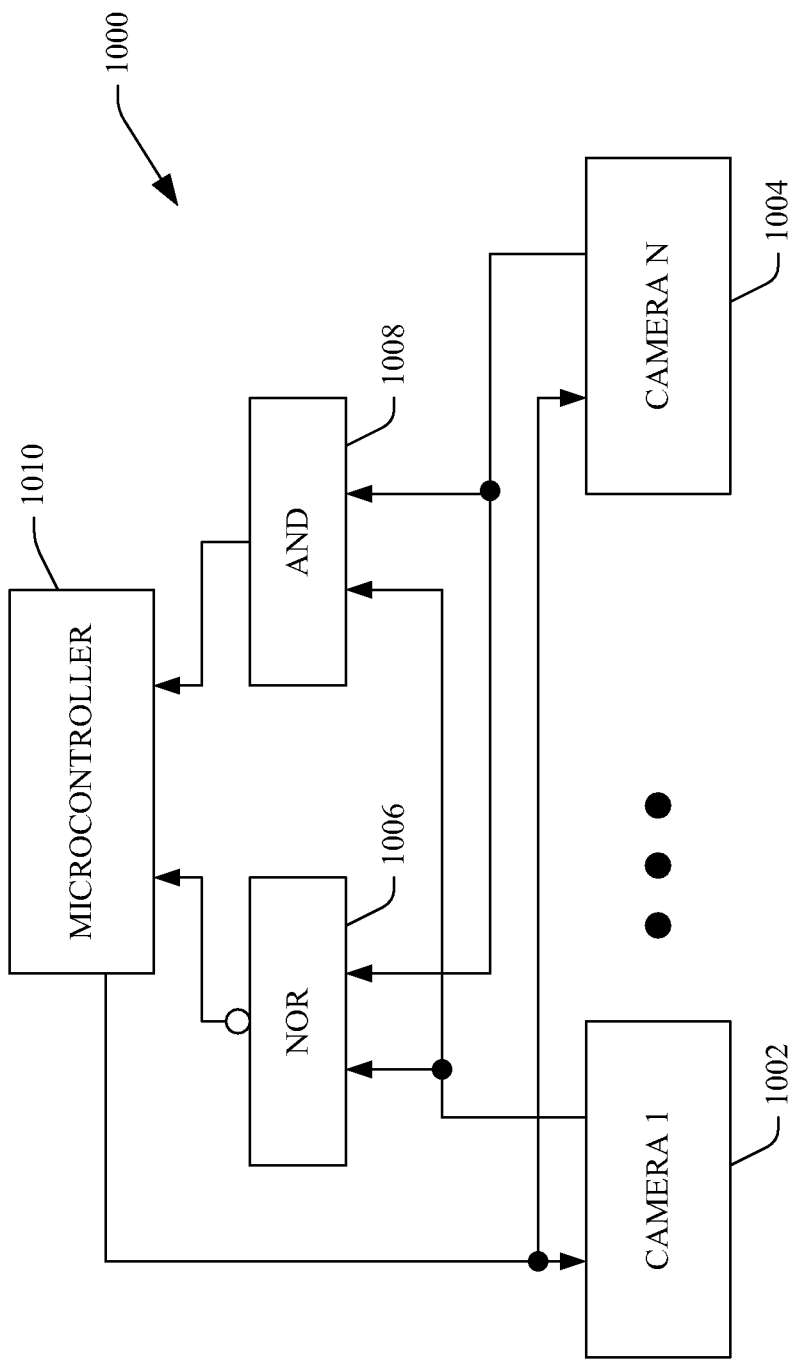
FIG. 10 is an example system that facilitates causing a plurality of cameras to substantially simultaneously capture images.

With reference now to FIG. 10, an example schematic 1000 of trigger circuitry that can cause a plurality of cameras to substantially synchronously obtain first images of a first resolution and subsequent second images of a second (full) resolution is illustrated. The schematic 1000 includes a first camera 1002 through an nth camera 1004. As has been described above, the cameras 1002-1004 can be configured to capture two images in a relatively short period of time, wherein a first of the two images is of a lower resolution than a second of the two images. Thus, the cameras 1002-1004 can output two different ready signals. A first ready signal indicating that the cameras are configured to capture a first image of the first resolution and a second ready signal to indicate that the cameras are configured to capture a second image of the second resolution. To indicate that the cameras are configured to capture a first image of the first resolution, the cameras 1002-1004 can output logical low signals. A logical NOR gate 1006 can be configured to receive these ready signals from the cameras 1002 through 1004. If the ready signals of the cameras 1002-1004 are all low, output of the logical NOR gate 1006 will be high.

The cameras 1002-1004 can also be configured to output a high signal as a ready signal when the cameras 1002-1004 are configured to capture a second image of the second resolution. A logical AND gate 1008 can be configured to receive such ready signals and can output a logical high if both of the ready signals of the cameras 1002-1004 are high. A microcontroller 1010 can monitor the signals of the logical NOR gate 1006 and the logical AND gate 1008 and can output trigger signals when either of the output of the logical NOR gate 1006 and/or the output of the logical AND gate 1008 is high.

In operation, the cameras 1002-1004 can be configured to capture a first image of a first (less than full) resolution. Once such cameras 1002-1004 are configured to capture the first image, the cameras 1002-1004 can output a low signal. A low signal can be received by both the NOR gate 1006 and the AND gate 1008. If the signals output by the cameras 1002-1004 are all low, output of the logical NOR gate 1006 will go high. The microcontroller 1010 can monitor outputs of both the logical NOR gate 1006 and the logical AND gate 1008 and can output a trigger signal as soon as output of the logical NOR gate 1006 goes high. The output trigger signal can cause the cameras 1002-1004 to substantially synchronously capture a first image of less than a full resolution.

Once the cameras 1002-1004 have captured the first image, such cameras 1002-1004 can be configured to capture an image of a second resolution which is higher than the first resolution. For instance, configuring cameras 1002-1004 can include turning binning off. Configuring the cameras 1002-1004 can further include setting an exposure time to use when capturing a subsequent image. Once the cameras 1002-1004 are configured to capture an image of a higher resolution, the cameras 1002-1004 can output a logical high. When all of the cameras 1002-1004 have output a high signal, output of the logical AND gate 1008 will go high. The microcontroller 1010 can monitor outputs of both the logical NOR gate 1006 and the logical AND gate 1008 and when the logical AND gate 1008 goes high, the microcontroller 1010 can output another trigger signal. The cameras 1002-1004 can receive the trigger signal at a substantially similar point in time and can therefore substantially synchronously capture a second image of a higher resolution.

Figure 11:
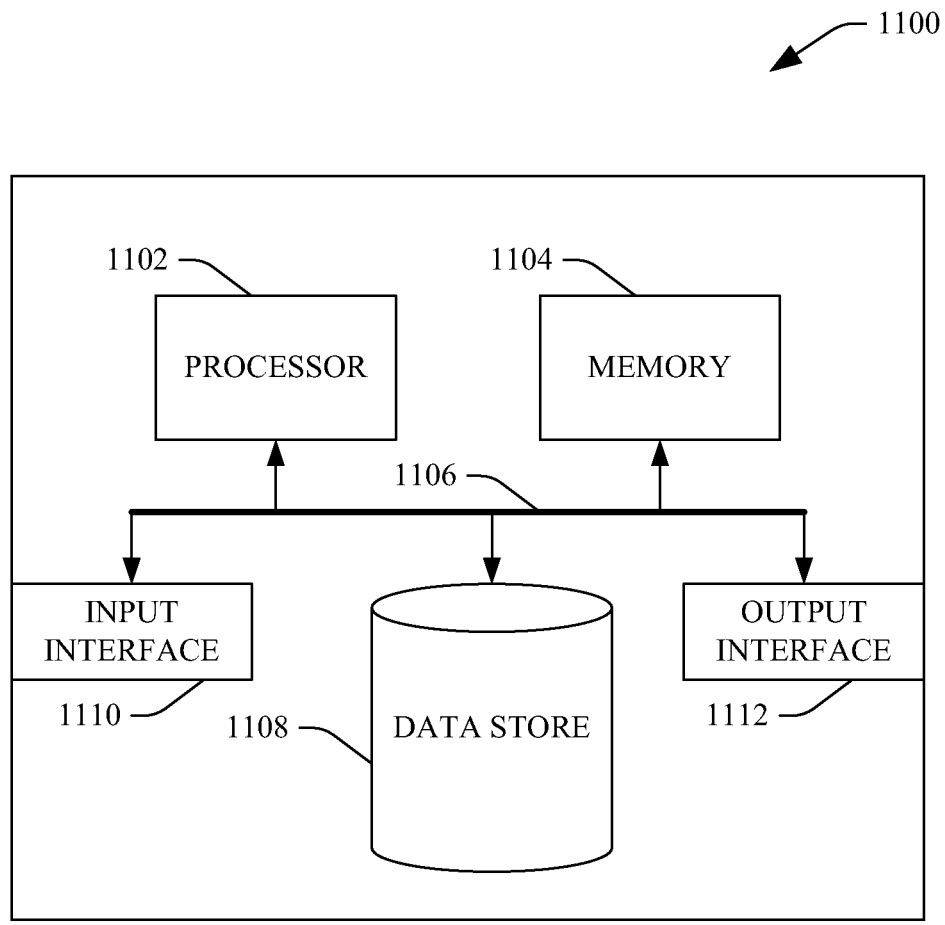
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports capturing digital images. For instance the computing device 1100 can be a digital camera, a personal digital assistant, a cellular telephone, or other device that can include a digital camera. In another example, at least a portion of the computing device 1100 may be used in a system that supports synchronizing cameras and/or storing digital images. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store intensity values, histograms, trigger instructions, exposure times, etc.

The computing device 1100 additionally includes a data store 1108 that is accessible by the processor 1102 by way of the system bus 1106. The data store 1108 may include executable instructions, exposure times, histograms, etc. The computing device 1100 also includes an input interface 1110 that allows external devices to communicate with the computing device 1100. For instance, the input interface 1110 may be used to receive instructions from an external computer device, instructions from a triggering mechanism, instructions from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

The invention claimed is:

1. A system comprising:
a processor; and
a memory that comprises a plurality of components that are executed by the processor, the plurality of components comprising:
a partitioner component that partitions a first image into partitions, wherein the first image is captured by an image sensor of a digital camera, the first image having a first resolution;
a weight assigner component that assigns respective weights to the partitions; and
a setter component that determines respective exposures times for the plurality of partitions based upon the respective weights, and sets an exposure time for capturing a second image by the image sensor of the digital camera based at least in part upon the respective exposure times, the second image having a second resolution, the second resolution being greater than the first resolution.

2. The system of claim 1, the plurality of components further comprising:
an analyzer component that analyzes a histogram of the first image, wherein the setter component further sets the exposure time for capturing the second image in the image sensor of the digital camera based at least in part upon the analysis of the histogram of the first image.

3. The system of claim 2, the plurality of components further comprising a histogram generator component that generates the histogram, wherein the histogram includes a plurality of different intensity values and a number of occurrences in the first image of the plurality of different intensity values.

4. The system of claim 3, wherein the analysis undertaken by the analyzer component comprises determining a white point value, wherein the white point value corresponds to an intensity value where a predefined percentage of bins have an intensity value no higher than the determined white point value.

5. The system of claim 4, wherein the setter component further sets the exposure time for capturing the second image based at least in part upon the determined white point value.

6. The system of claim 5, wherein the setter component further sets the exposure time for capturing the second image based at least in part upon an exposure time used to capture the first image.

7. The system of claim 6, wherein the setter component further sets the exposure time for capturing the second image based at least in part upon a binning factor used to cause the first image to be of the first resolution.

8. The system of claim 7, wherein the setter component further sets the exposure time for capturing the second image based at least in part upon a target gray value of the second image.

9. The system of claim 1, the plurality of components further comprising a configuration component that configures the digital camera to capture the first image at the first resolution.

10. The system of claim 9, the plurality of components further comprising a binner component that bins intensity values from cells in the image sensor to cause the first image to be of the first resolution.

11. The system of claim 1, wherein the setter component is configured to set an exposure time for the first image.

12. The system of claim 11, wherein the setter component is configured to set the exposure time for the first image at approximately ten microseconds.

13. A method comprising acts that are executed by at least one processor, the acts comprising:
    capturing a first image using an image sensor of a digital camera, the first image having a first resolution;
    partitioning the first image into at least a first partition and a second partition;
    assigning a first weight to the first partition;
    assigning a second weight to the second partition;
    determining a first exposure time for the first partition;
    determining a second exposure time for the second partition;
    determining an exposure time for a second image based at least in part upon the first exposure time, the second exposure time, the first weight, and the second weight; and
    capturing the second image using the image sensor of the digital camera using the determined exposure time, the second imaging having a second resolution, the second resolution greater than the first resolution.

14. The method of claim 13, wherein the second image is captured within twenty milliseconds of the first image being captured.

15. The method of claim 13, the acts further comprising using binning to cause the first image to be of the first resolution.

16. The method of claim 15, the acts further comprising setting an exposure time of ten microseconds for capturing the first image.

17. The method of claim 15, the acts further comprising:
    generating a histogram that includes a number of occurrences of intensity of charges pertaining to a plurality of bins; and
    further determining the exposure time for the second image based at least in part upon the histogram.

18. A camera comprising a computer-readable medium, the computer-readable medium comprising instructions that, when executed by a processor, cause the processor to perform acts comprising:
    capturing a first image in an image sensor, the first image having a first resolution;
    partitioning the first image into at least a first partition and a second partition;
    assigning a first weight to the first partition;
    assigning a second weight to the second partition;
    determining a first exposure time for the first partition;
    determining a second exposure time for the second partition; and
    determining an exposure time for a second image based at least in part upon the first exposure time, the second exposure time, the first weight, and the second weight, the second image having a second resolution, the second resolution being higher than the first resolution; and
    capturing the second image in the image sensor using the exposure time determined for the second image.

19. The camera of claim 18 comprised by a mobile telephone.

20. The camera of claim 18 configured to capture images of the second resolution at a frame rate between five and twenty five frames per second.

* * * * *